United States Patent [19]

Liller

[11] 4,397,071

[45] * Aug. 9, 1983

[54] METHOD OF INSTALLING REPLACEABLE SLEEVE IN FIXED VORTEX FINDER

[76] Inventor: Delbert I. Liller, P.O. Box 64, Deer Park, Md. 22150

[ * ] Notice: The portion of the term of this patent subsequent to Nov. 25, 1997, has been disclaimed.

[21] Appl. No.: 173,557

[22] Filed: Jul. 30, 1980

Related U.S. Application Data

[62] Division of Ser. No. 56,108, Jul. 9, 1979, Pat. No. 4,235,363, which is a division of Ser. No. 2,731, Jan. 11, 1979, Pat. No. 4,224,143.

[51] Int. Cl.$^3$ .......................... B23P 6/00; B04C 5/13

[52] U.S. Cl. ............................... 29/401.1; 29/402.08; 29/402.14

[58] Field of Search ............ 29/401.1, 402.08, 402.14; 209/144, 211; 279/93

[56] References Cited

U.S. PATENT DOCUMENTS 2,337,402 12/1943 Mills .................................... 279/93

4,235,363 11/1980 Liller .................................. 209/211

*Primary Examiner*—Kenneth J. Ramsey

*Attorney, Agent, or Firm*—A. A. Saffitz

[57] ABSTRACT

A method of installing a sleeve within an vortex finder of a cyclone separator to adjust the diameter of the vortex setting. To facilitate installation of the sleeve, the dish-shaped bottom of the cyclone is mounted on a plate which can be lowered and then pivoted aside. The sleeve is provided with a collar which is stitch welded to the vortex finder to retain the sleeve in place. Alternatively, the collar and vortex finder are provided with a bayonet joint to releasably retain the sleeve. A kit of sleeve assemblies of different diameters is provided to accommodate the adjustment of the vortex setting.

1 Claim, 12 Drawing Figures

LEGEND

| ZONE | SOLID DENSITY |
| --- | --- |
| 1 | LIGHTEST |
| 2 | LIGHTER |
| 3 | LIGHT |
| 4 | HEAVIER |
| 5 | HEAVIEST |

METHOD OF INSTALLING REPLACEABLE SLEEVE IN FIXED VORTEX FINDER

This is a division of application Ser. No. 56108, filed July 9, 1979, now Pat. No. 4,235,363 which is a Div. of Ser. No. 2731, filed Jan. 11, 1979, now U.S. Pat. No. 4,229,143.

CROSS REFERENCE TO RELATED APPLICATIONS

The subject matter of this application is related to my following applications: Ser. No. 860,330, filed Dec. 14, 1977 now U.S. Pat. 4,219,409 issuing Aug. 26, 1980. the disclosure of which is also found in a patented divisional application, U.S. Pat. No. 4,164,467, issued Aug. 14, 1979 and Ser. No. 860,331, filed Dec. 14, 1977 now U.S. Pat. No. 4,157,295, issued June 5, 1979. Other divisional applications, Ser. Nos. 926,168, filed July 19, 1978, now U.S. Pat. No. 4,159,073 and 973,408, filed Dec. 26, 1978, now U.S. Pat. No. 4,217,207 issuing Aug. 12, 1980, have evolved from application Ser. No. 860,330.

BACKGROUND OF THE INVENTION

Field of the Invention

This invention lies in the field of washing coal with water only in a shallow bottomed centrifugal separating cyclone of circular cross-section having a cylindrical portion with a diameter to height ratio of 0.8 to 1.3, preferably 0.90 to 0.95, the cyclone fitted with a single inlet pipe, a shallow dish below the cylindrical portion, a single bottom orifice fitted to the shallow dish and a fixed vortex finder leading to an outlet at the top for removal of washed coal. Gravity separation under streamlined flow is accomplished with light coal particles at a gravity value down to about 1.3 using crushed coal ranging in size from $1\frac{3}{4}''\times 0$ down to $\frac{3}{8}''\times 0$.

The invention also lies in the field of providing an easily insertable abrasion resistant bottom dish having unique toughness and wear resistance characteristics to provide trouble-free, efficient coal washing based on the special material characteristics and the critical geometry of the shallow bottom dish which adapts it to fit in a closely contoured relationship to the cylindrical portion of the cyclone.

Further, the invention lies in the field of rebuilding cyclones to include the insertable dish and orifice and set the critical adjustments of the invention.

The invention also lies in the field of cleaning ores other than coal to rid them of impurities by taking advantage of the newly discovered efficiency and capacity taught in the present application.

Description of the Prior Art

1. Copending Application Ser. No. 860,330, filed Dec. 14, 1978:

My copending application, Case No. 1, Ser. No. 860,330, filed Dec. 14, 1977, is incorporated herein by reference and teaches creating directed streamlined flow by directing incoming high solids concentrations of crushed coal in water tangentially along the wall of the bowl of a shallow bottomed cyclone while diverging two streams, namely the incoming inlet coal slurry stream and the swirling coal slurry stream, in the cyclone. As a result, the essential preliminary condition of streamlined flow is created. This flow must occur in the centrifugal cyclone in order to accomplish efficient and high capacity washing of coal or other ores to separate impurities having a different gravity than the cleaned material.

2. Prior literature on Operation of Centrifugal Separating Cyclones:

Chemical Engineers' Handbook by Robert H. Perry and Cecil H. Chilton, published by McGraw-Hill Book Company, at pages section 21 page 57 describes the operating conditions for the separating cyclone water washing of coal, namely inlet pressure of about 10 to 14 pounds per square inch gauge pressure for a 20 to 24 inch cyclone, which is the commonly used cyclone size in coal washing plants. The lower limit below which recovery of low gravity coal cannot be achieved is about 6 to 8 pounds per square inch gauge pressure. Finer sizes of crushed coal are separated at slightly higher pressures but pressures above 14 pounds per square inch are not recommended because of accelerated wear. Residence time is very short. The cyclone shown in the Handbook has a long cone and a large volume is circulated for each ton of feed treated in the cone. This results in high energy consumption, low tonnage recovery based on water used and high equipment cost.

Coal Processing Equipment of Uniontown, Pennsylvania describes a Var-A-Wall coal washing plant in the brochure entitled "Hydronomic Modular, Multimedia Coal Washer". The Coal Processing Equipment plant is designed to provide an outside adjustable wall to increase the height of the cyclone. The dominant feature is jigging with washing done under low water pressure. The extension of the cylinder wall length and volume and a variable depth adjustment of the vortex finder tube create a higher energy loss in a longer cyclone with greater water requirements.

The Keystone Coal Industry Manual, Copyright 1977, McGraw-Hill, Inc., is a directory of mechanical coal cleaning plants which describes the name, location, daily capacity, type of cleaning and plant design. The directory identifies 175 plants within the continental United States and 2 plants in Canada which use low pressure jigging cyclones for coal washing at low solids. Most of these jigging cyclones are heavy media plants utilizing a magnetite suspension. Substantially all heavy media cyclones operate at recommended 10 to 12 pounds per square inch pressure. Present recommendations to coal plant operators is to utilize jigging action and steeper cones so that the pressure drops in the cone substantially to atmospheric pressure at the refuse outlet.

The article "Preparation Trends" published in World Coal, March 1978, page 13, gives the basic performance data for a heavy media jigging cyclone (24 inch). The crushed coal feed is $\frac{3}{8}''\times 0$ which is separated in three fractions, e.g., $\frac{3}{8}''\times 28$ mesh, 28 mesh$\times$100 mesh and 100 mesh$\times$0. These plants operate at a 1.76 density separation. Magnetite losses are about 1 kilogram per ton of goal washed. The objective is for a separation as low as 1.40 relative density.

The Jan. 1, 1978 issue of Coal Age, pages 65 through 84, provides a portfolio of flow sheets for the washing plant at the American Electric Power Mine, Helper Site, Salt Lake City, Utah using heavy media cyclones and special water conservation methods. A similar heavy media plant is shown of the Roberts and Schaefer design with a production rate of 1,750 tons per hour. A third heavy media plant from McNally-Pittsburgh is shown for the Jefferson County Mine in Alabama. Still another heavy media Heyl and Patterson cyclone plant is shown which is designed for existing 650 Mw generating units. Yet another preparation plant is shown in Mingo County, W. Va. All of these use heavy media and all are in the multi-million dollar category. In contrast, the capital investment in the present retrofitted cyclone is a small fraction of these costs. To illustrate, the McNally-Pittsburgh plant at Wilson, Md. invested 96 million dollars to process 1,000 tons per hour by jigging while the two stage plant of the invention invests slightly less than 1 million dollars to process 150 tons per hour by streamlined centrifugal separation. At the same output, the jigging choice costs 15 times as much as the centrifugal separation of the invention.

Fitch, U.S. Pat. No. 2,981,413, dated April 1961, proposed the use of a vortex finder as a classifier means in a large capacity cyclone for the separation of fine from coarse particles in a process of separating solids in liquid suspension.

Visman, Reissue No. 26,720, dated November 1969, was the first to realize success in keeping size separation, as in Fitch, to a minimum while achieving gravity separation using finely crushed coals. Visman's examples are all at $\frac{1}{4}''\times 0$ at low pulp solids at about 10% in contrast to 10% to 35% of solids herein. Visman's object was to achieve a jigging action along a horizontal section of his uniquely designed cyclone to separate fine particles from coarse particles in contrast to centrifugal separation herein. Both Visman and Fitch first created turbulence by jigging and then tried to control turbulence at the separation zone where the light particles were removed from the heavy particles. In contrast, the invention herein described avoids turbulence.

Loughner, U.S. Pat. No. 3,887,456, dated June 1975, discloses a shallow bottomed separating cyclone in which controlled turbulence by jigging is introduced into the bowl by riffler means. In Loughner, rifflers are provided to gently open a bed of heavier particles and release lighter particles, thereby permitting the lighter particles to be displaced and more centrally aligned for more complete separation.

Samson et al, U.S. Pat. No. 2,377,524, dated June 1945, is cited by Fitch in his U.S. Pat. No. 2,981,413 as an early example of an unobstructed freely whirling liquid in the interior of the casing having an axis of radial symmetry, the casing fitted with a vortex finder for clean particles at the top and an orifice at the bottom through which the heavy particles of grit and sand are removed. Samson emphasized the high velocity of 25 feet per second which sets up centrifugal separating forces to push heavy particles against the wall of the cone creating a vortical whirl which causes an upward stream of lights at the center of the cone. Both Fitch and Samson teach a long cone dimension, in Samson 5 to 15 times the diameter of the cylindrical portion, leading one away from the shallow dish concept of the present invention.

Hirsch, U.S. Pat. No. 2,975,896, dated March 1961, describes the basic construction of a three piece cyclone, e.g., a top cylindrical portion bolted to an intermediate conical portion which is in turn bolted to a bottom tapered orifice portion. Hirsch recognized that the tapered dish constituting the intermediate portion and the orifice portion would wear faster, necessitating replacement of the worn part.

OBJECTS OF THE INVENTION

An object of the invention is to provide a method for dimensioning and adjusting at a static position the vortex finder and orifice diameter in a separable shallow dish fitted centrifugal separating cyclone having a single inlet delivering streamlined flow into the centrifugal separating cyclone. A cylindrical bowl having a height comparable to its diameter, a vortex finder set above the top of the dish, an outlet pipe at the top of the cyclone converted to the vortex finder for separation of lights and a single orifice at the bottom of the dish.

A further object of the invention is to provide a wear-resistant centrifugal separating cyclone fitted with separable shallow dish for washing crushed coal having a single inlet with deflector delivering streamlined flow into the bowl as disclosed in my copending application Ser. No. 860,330, filed Dec. 14, 1977, a cylindrical body, a shallow dish, a vortex finder adjusted at the top of the dish for a recovery which depends upon the size, sulfur content, fracturability and ash content of the coal and an orifice diameter which sets the recovery together with the diameter adjustment of the vortex finder.

A further object of the invention is to provide a novel quick replacement type of vortex finder kit for varying the diameter to adjust the recovery of coal as set forth in the preceding paragraph.

SUMMARY OF THE INVENTION

Contrary to the low solids, jigging turbulence and low velocity operations of the prior art, it is a fundamental feature of the present invention and the invention in my Case No. 1, Ser. No. 860,330, that:

(1) the pressure drop be high rather than low, at least 0.9 and preferably 1.5 atmospheres above gauge pressure, between the inlet into the cyclone and the outlet above the cyclone leading away from the vortex finder;

(2) the solids content of unwashed coal be at least twice as high, preferably between 2 to 4 times as high (optimally at least 15% and up to 35% solids), compared to that used in Loughner or Visman;

(3) a high flow rate at high solids provide high capacity at lower water requirement for washing than is taught by patents to Visman or Loughner or in the *Chemical Engineers' Handbook;*

(4) the separating capacity of the shallow bottomed cyclone be increased due to forcing the incoming particles into the cyclone bowl toward the tangential wall by deflector means shown in my Case No. 1;

(5) critical settings of the percent recovery be made of the vortex finder area relative to the bottom orifice area to determine the percent recovery at the top of the cyclone;

The invention also is based upon ascertaining the critical setting from analysis of about 190,000 to 200,000 tons of coal the separation characteristics of a shallow bottomed water only cyclone comprising a cylindrical bowl, a single inlet tube, a single bottom orifice in a detachable shallow dish at the cyclone bottom, a fixed vortex finder, a box and an outlet pipe above the vortex finder for removing the light washed particles separated in the cyclone.

A quick-change conical dish supporting plate having openings for nut and nolt fasteners is provided for either a clarifying cyclone, such as the two section long cone dish of Hirsch, U.S. Pat. No. 2,975,896, or for a jigging cyclone, such as Loughner, U.S. Pat. No. 3,887,456, or for the present squat cyclone of critical height to diameter ratio, preferably 0.90 to 0.95. The quick-change plate permits a change of dish, when worn, change of vortex finder, or change of both, from the bottom.

A new vortex finder sleeve kit is also provided which permits changes to be made for adjusting percent recovery and clean coal quality, e.g., reduction of the mineral ash and inorganic sulfur content. This kit may be installed by tack and stitch welding or, for small diameter cyclones, by mirror welding. A bayonet sleeve kit is also described.

The engineering application of critical settings has been summarized in the disclosure of the application for all centrifugal separating cyclones having a broad height to diameter limit of 0.8 to 1.3, preferably 0.90 to 0.95, wherein all cyclone dimensions are expressed in terms of inner bowl diameter, e.g., B. All inlet pipe, outlet pipe, vortex finder sleeve and orifice dimensions are expressed in terms of B and the specific values are shown in Table A herein.

Figure 1:
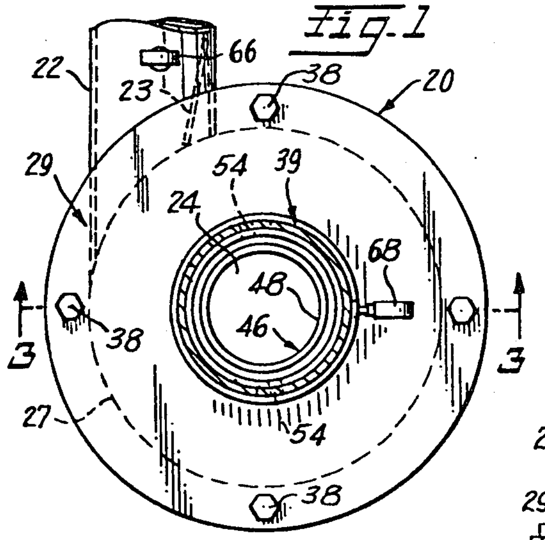
FIG. 1 is a fragmentary plan view of the centrifugal cyclone of the present invention.

In all of the Figs. of the drawing, the views are to scale and in accordance with the Examples, which illustrate operations in an 18" cyclone. The representation of the path of the streamlined flow deflected slurry entering the inlet is based upon actual observation and analysis wherein different methods corroborated the particular path which is shown.

The input to each of the cyclone structures is in the form of crushed coal which may vary up to $1\frac{1}{4}\times 0$ and down to about $\frac{3}{8}\times 0$, the range preferred for coal which is difficult to fracture being $\frac{3}{8}\times 0$ and for easily fracturable coal, $\frac{3}{4}\times 0$, other factors, such as high sulfur or ash content, being taken into account. The narrow range of critical settings for dimensions of the structures and parts is summarized, based upon test data, in Table A herein. This Table A expresses all values in terms of B, inner bowl diameter, to permit prediction of other sizes.

DESCRIPTION OF THE PREFERRED EMBODIMENTS

The embodiments illustrated in the accompanying drawings and following description and examples exemplify an improvement of the cyclone structure disclosed in my U.S. Pat. Nos. 4,159,073, 4,164,467, 4,217,207 and 4,219,409 issuing on Aug. 26, 1980. Additional features are disclosed in my parent application Ser. No. 2,731 filed Jan. 11, 1979.

Figure 3:
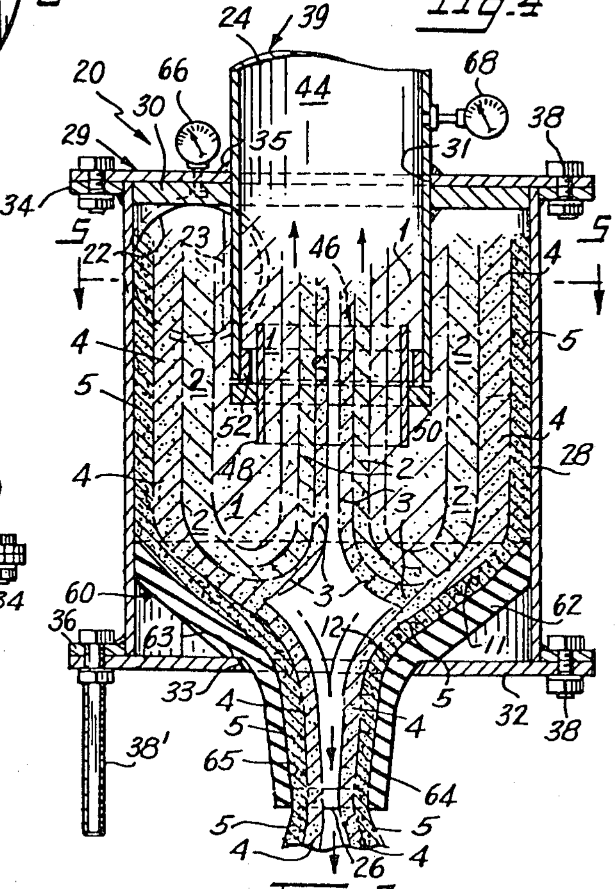
FIG. 3 is an enlarged fragmentary vertical sectional view of the cyclone taken on line 3—3 of FIG. 1.
Figure 5:
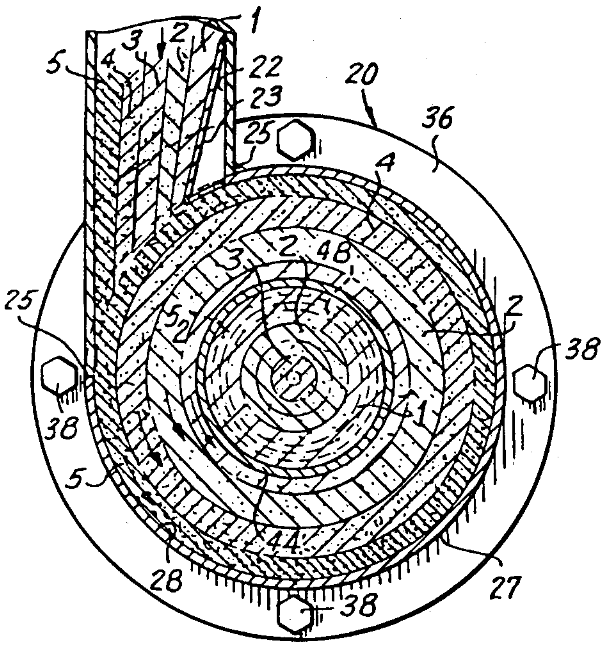
FIG. 5 is a fragmentary horizontal sectional view, taken on the line 5—5 of FIG. 3.

There is shown in FIGS. 1, 2, 3, 5, 6, 7 and 8 herein a centrifugal cyclone 20 fitted with deflector 23 for creating streamlined flow in a "water only" coal washing. As described in U.S. Pat. No. 4,219,409, the centrifugal cyclone 20 is used to create streamlined flow in a continuous coal washing plant comprising a slurry tank for mixing raw crushed coal and water, a pump feeding the slurry through an inlet 22 into centrifugal cyclones 20, a plurality of centrifugal cyclones 20, each cyclone 20 having two outlets 24 and 26, one outlet 24 at the top and the other refuse outlet 26 at the bottom of each cyclone 20, and one inlet 22 into the cyclone bowl B (28) within housing 27. The inlet 22 is fed by a pump with the slurry of crushed raw coal and water to undergo separation under centrifugal forces whereby clean coal is separated at the top outlet 24 of each cyclone 20 and heavy refuse is withdrawn from the bottom outlet 26. The clean coal consists of coarse coal particles and fine coal particles in water circulating in a closed clean coal circuit as shown in the aforesaid U.S. Pat. No. 4,219,409. Inlet 22 is joined by weld 25 to cyclone bowl 28 with no or minimal clearance from the top 30 of the cyclone. Outlet 24 comprises a vortex finder 44, 144 or 244 which extends into the cyclone bowl through an opening 31 in cover member 29 which is secured to flange 34 by bolts 38;

FIG. 3 herein shows the separated interior zones 1, 2, 3, 4 and 5 in the cyclone 20 to illustrate vertical layering due to deflector 23. The development of vertical stratification layers 1, 2, 3, 4 and 5 in the cross hatched shading result also from pressure differential between gauges 66 and 68 and the installation of the deflector 23 as is best shown in FIG. 3.

Layers 3 and 4 represent the middling coal. In path washing which is the main objective, clean coal transfers into layers 1 and 2, and part of 3 and as illustrated may be the 1.5 specific gravity layer containing the 1.5 specific gravity middlings. Layers 4 and 5 may be the 1.6+ specific gravity layer containing refuse of 2.6+ specific gravity containing clays, pyrites, etc.

FIG. 3 herein and FIG. 1 differ in respect to the introduction of threaded pivot or fixture bolt 38' which is of critical length, threaded at the top and bottom to permit the nut to be shifted from top to bottom, to drop plate 32 while supporting the shallow dish and pivot both dish and plate clockwise for immediate access. The need for the quick opening arrangement also occurs in the frequent requirement to replace parts whose wear alters % recovery and clean coal quality (ash). Recognizing these needs was based upon over a thousand hours of analysis of results of washing and unrecognized mistakes were later uncovered by analyses Later experiments where the results of FIG. 12 washing in Ser. No. 860,330 show failure to reproduce the limits of washing found in the first experiments, the selected vortex finder settings were found to be altered also by differences in fractionability of the coal, especially in respect to the sulfur content which could be removed by centrifugal washing. Thus, it was obvious that quick changes were needed to make different settings of Vortex Finder D and the detailed aspects are described below.

Quick Change Plate 32

Figure 6:
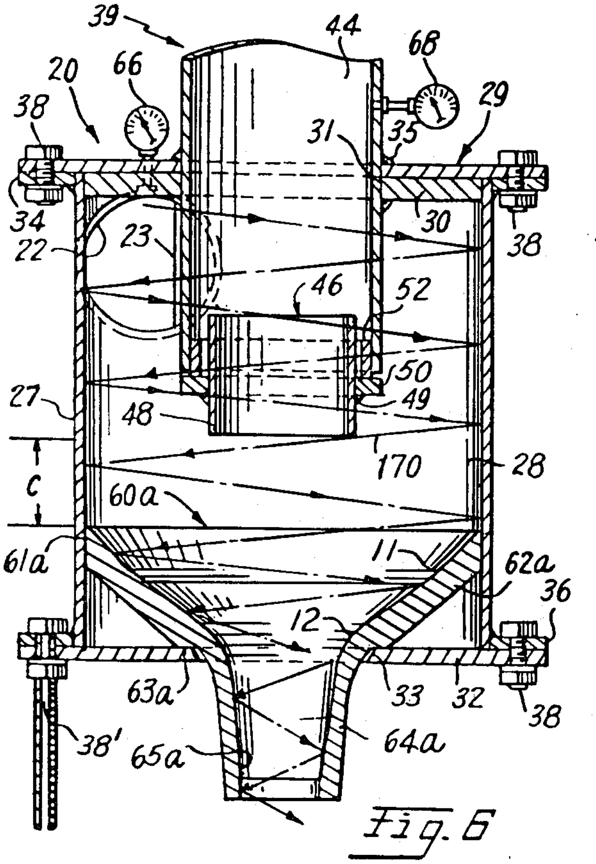
FIG. 6 is a vertical sectional view, similar to FIG. 3, showing the path of the spiral turns of the processed material within the cyclone as it progresses toward the bottom orifice.

It is a critical feature of the present invention shown in FIGS. 3 and 6, that a single circular bottom plate 32, be provided with a single beveled circular central orifice 33, proportioned precisely to encompass the beveled shoulder 63, 63A between the top of the orifice 64, 64A, and the bottom of the shallow dishes 62, 62A.

The bottom plate 32 has the appearance of a giant washer and the edges are provided with suitable openings for a plurality of threaded fasteners 38 including elongated fixture bolt 38 of the nut and bolt type. In one embodiment these lie equally spaced on a common circle at the cardinal compass points, for example, 0°, 90°, 180°, 270°. However, two fasteners 38, 180° apart, three fasteners 38, 120° apart, have been used with equal success. Five fasteners 38 are not necessary.

It is a unique advantage of this single circular bolt fastened plate 32 with small center hold 33 and fixture bolt 38 that the shallow dishes 62,62A, orifices 64, vortex finder housing 44 and vortex finder-sleeve 46 are all fixed by the single plate 32 to share a common axis which is the axis of cyclone 20.

Utility of Quick Change Plate 32 For Jigging Cyclones and Other Cyclones

The novel quick change mounting plate 32 and fasteners 38 with elongated pivot bolt 38' is particularly adapted for improving the operation of the jigging cyclone disclosed in Loughner U.S. Pat. No. 3,887,456, and especially for changing the setting of the vortex finder in that patent.

Note that in Loughner, FIG. 1, plate 17 is seemingly fastened to the dish 20 and also is the bottom of the flange 16 at the base of cylindrical bowl wall 11. A plurality of bolts 18 fasten the flange 16 to plate 17 and a plurality of bolts (not numbered) fasten the separable orifice to the bottom portion of the dish 20 and plate. In short, the inner bolts of Loughner connect three parts, e.g., plate, orifice and dish, and the outer bolts connect two parts, plate and the cyclone bottom flange.

The inventor has attempted to change the vortex finder 46, 146 and 246 diameter by replacement in the apparatus of Loughner first by dismantling the top and then by dismantling the bottom. Dismantling from the top took about one (1) hour. It took about one-quarter (¼) hour longer to install the new, narrower vortex finder sleeve, and then to fix it.

In contrast, the bottom changing operation in accordance with the present invention takes five (5) minutes or less, using the novel vortex finder sleeve kit 46 of the invention as described in Section (4) below.

Similarly, changing a dish to alter recovery or quality of washed coal in Loughner's jigging cyclone requires that forty-five (45) minutes to one (1) hour for cement removal and unbolting and rebolting operations. With the invention, the time is about one-tenth (1/10) that in Loughner.

Also, there is no need in the present invention to change the orifice as in Loughner. This need is accomplished in the invention by simply changing the dish 62, 62A, which with the orifice 64, 64A, makes one unit 60, 60A. A new cooperation between dish 62, 62A, and orifice 64, 64A, exists in the invention, based upon geometry, Table A, of the one-piece structure 60, 60A, which is described in Section (5) below.

Visman U.S. Pat. No. RE 26,720 is like Loughner U.S. Pat. No. 3,887,456 in respect to requiring opening the cyclone from the top either to change the vortex finder setting, e.g., the distance between the lowest edge of the vortex finder to the top edge of the dish (see FIG. 1 in Visman). In contrast to Loughner's dish which is cemented at the outer thin upper edge to the inner circular wall of the cyclone, Visman bolts his conical dish in the form of a casting as drawn in FIG. 1 by means of bolts through the flange extending outwardly from the top frustrum 16 of the cone and this flange of the dish mates with the lower flange of the cyclone bowl.

The present quick change plate fitted with an elongated bolt fixture distinguishes over Visman in permitting immediate access to change the vortex finder from the bottom—there is no corresponding bottom quick change in Visman. Also, there is no need to remove the dish with the quick change plate and fixtures bolt when only the vortex finder and its sleeve are changed. The old dish is suspended by means of the fixture bolt. These same differences distinguish over Loughner also.

Figure 4:
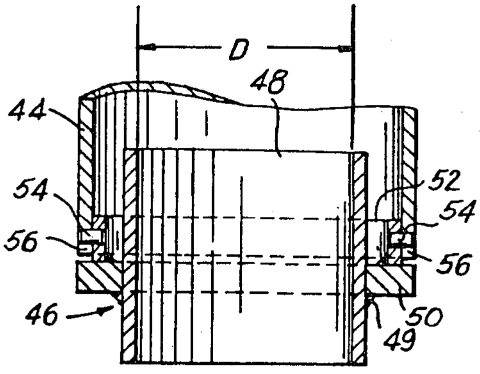
FIG. 4 is an enlarged fragmentary vertical sectional view through the detachable vortex finder sleeve of the cyclone of FIG. 1.
Figure 2:
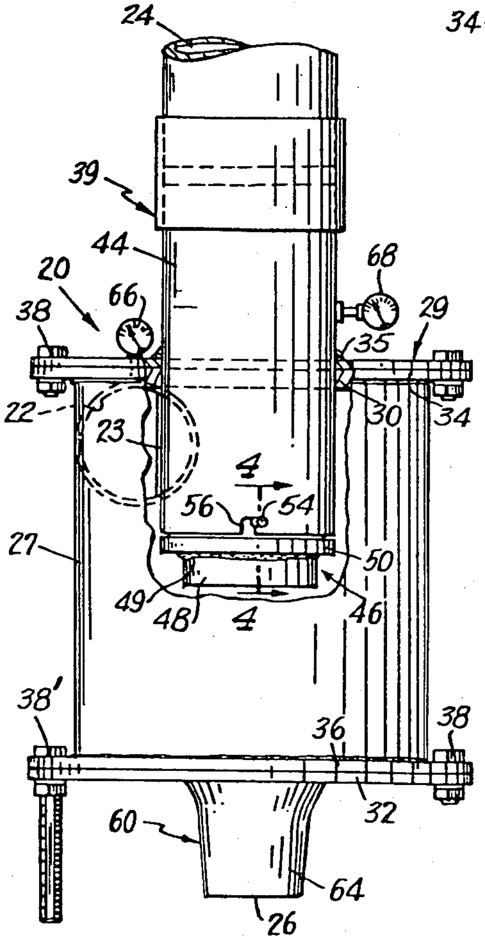
FIG. 2 is a fragmentary elevational view, partly in section, of the cyclone of FIG. 1, having a quick detachable vortex finder sleeve.
Figure 7:
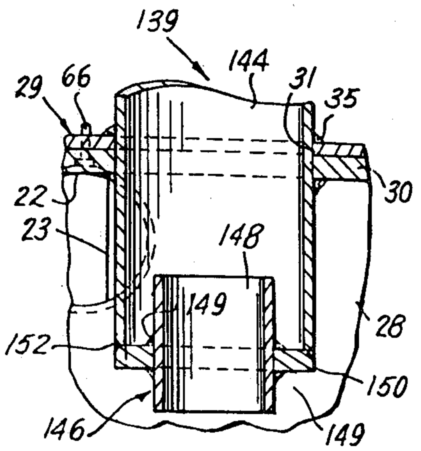
FIGS. 7 and 8 are fragmentary vertical sectional views illustrating modifications of the vortex finding sleeves.

The vortex finder sleeve kit shown best in FIGS. 2, 4, 7 and 8 which is described in greater detail below may be of the weld on type as sown in FIGS. 7 and 8 or may be of the bayonet socket type shown in FIGS. 2, 4 and 6. To convert from a larger vortex finder area based on the diameter D shown in Table A, to a smaller vortex finder area is the first step needed to reduce recovery of washed coal. This reduction is dictated by the settings illustrated in FIG. 12 in meeting the requirements for clean coal quality of metallurgical grade coal.

A still more important difference over Loughner and Visman, which are the closest prior art to the present invention, is that neither ever conceived the need to change the vortex finder diameter. Only the inventor has made this discovery and it is fully explained in the description of critical parameters which follows.

In summary, the adaptability of the present plate support 32 in combination with the pivoting fixture bolt 38' to every type of cyclone, whether a jigging cyclone such as Loughner, or a gravity separate as Visman, or pulp clarifier as in Hirsch U.S. Pat. No. 2,975,896 is based upon the discovery that the central aligning opening 33 cooperates with the upper section of the conical dish in each example of these patents to serve as the sole support and to thereby align the center axis of the dish with the center axis of the vortex finder along a common line, the length of the pivoting fixture bolt being just slightly greater than the upper projection dish wall within the cyclone to permit this dish wall to drop a distance which permits pivoting the dish clockwise out of the center of the cyclone to be to a side for while suspended by the fixture bolt.

Structural and Operational Factors Predetermining Clean Coal Quality

The clean coal quality is controlled by certain factors, some of which are:

1. The percent clean coal recovery setting.
2. The inside geometry of the dish and orifice unit 60, 60A, 70, 80 and 90 of FIGS. 3, 6, 9, 10 and 11. Turbulence must be kept at a minimum. Smooth flow is essential. No irregularities can be allowed within the dish orifice unit 60, 60A, 70, 80 and 90 of FIGS. 3, 6, 9, 10 and 11. These set up disturbing flow patterns that cause obvious remixing of clean coal and refuse.

3. The swirling flow stream within the cyclone bowl 27 of FIGS. 1, 2, 3, 5 and 6.
4. The intersection angle in FIG. 5 between the deflector 23 and the tangent of bowl wall 28 of the inlet flow stream developing zones 1, 2, 3, 4 and 5 with the swirling flow stream within the cyclone bowl 28.
5. The depth C of the vortex finder sleeve 46, (Table A) 146 and 246 in FIGS. 2, 3, 6, 7 and 8 between plate 30 and the bottom of vortex finder 46, 146 and 246 of the vortex finder sleeve setting C (Table A) which remain fixed.
6. The height above the inlet 22, called the cyclone bowl head between 22 and 30, which is fixed and kept at zero or a minimum.
7. A smooth gradual transition from the cyclone bowl wall 28 into the dish 62, 62A, 72, 82 and 92 and orifice 64, 64A, 74, 84 and 94 unit 60, 60A, 70, 80 and 90.
8. First conical frustum $\theta_4$ in dish 62, 62A, 72, 82 and 92. (Table A)
9. Second conical frustum $\theta_5$ in dish 62, 62A, 72, 82 and 92 and with the combination of (8) and (9) equalling about 100° total included angle from the dish 62, 62A, 72, 82 and 92 entrance to the throat top M.
10. Third conical frustum of continuously changing angle $\Delta\theta$ from about 110° to about 12° over a short radius section between the dish 62, 62A, 72, 82 and 92 and orifice 64, 64A, 74, 84 and 94 unit 60, 60A, 70, 80 and 90. (Table A)
11. Fourth conical frustum being the included angle $\theta_9$, Table A (preferably 12°).
12. Fifth straight cylindrical short sections E and S, Table A.

In items (8) to (12) all conical and tapering sections are adjoined by smooth transition curves so as not to create any abrupt flow disturbances. (See FIGS. 3,6,9,10 and 11 and particularly reference numerals 11 and 12.

13. % Inorganic sulphur removed, at optimum particle size $\frac{1}{2}\times 0$ for easily fracturable coal and less for more difficult fracturing coal.
14. The influence of primary mineral impurities in coal on the fracturability in the preparation of $\frac{1}{2}\times 0$ size crushed coal for washing.

Factors Affecting Clean Coal Quality

Figure 12:
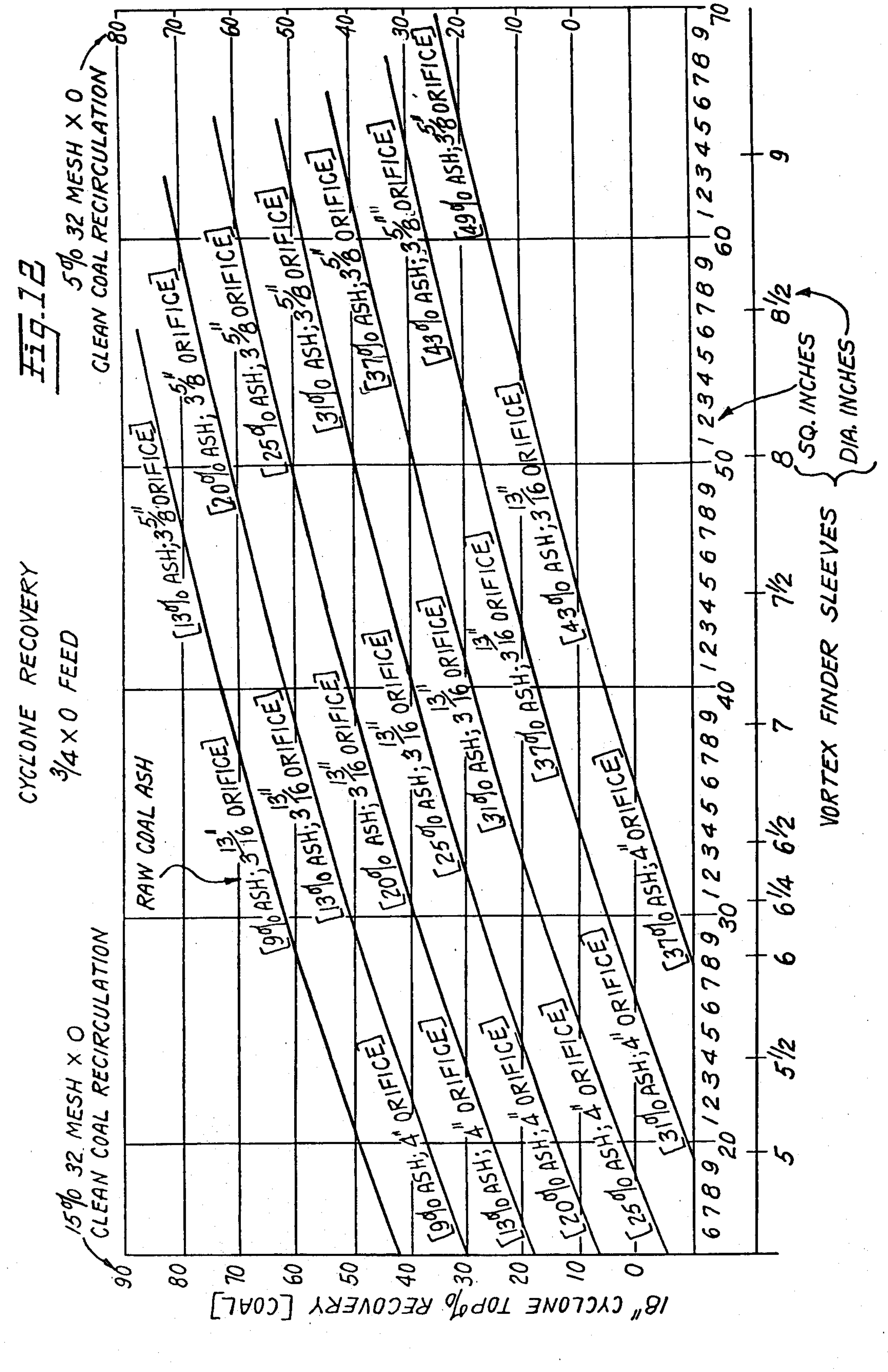
FIG. 12 is a graph of the vortex finder diameter settings, the percent of raw coal ash relative to refuse outlet orifice diameter and the cyclone to percent recovery.

Clean coal recovery, see FIG. 12, is controlled by four critical factors of which three are variable and can be adjusted by plant personnel. No. 3 and No. 4 are held constant, leaving only No. 2 for adjustment.

1. The % ash in the raw coal feed to the plant.
2. The diameter D of cylinder 48, 148 and 248 at minimum length of about 0.3B of the clean coal outlet 24 called the vortex finder sleeve 46, 146 and 246.
3. The diameter E and length J of the refuse outlet 26 called the bottom orifice 64, 64A, 74, 84 and 94. (Table A)
4. The inside geometry of the dish-orifice unit 60, 60A, 70, 80 and 90 which was solved during the wear problem and it remains fixed.

Although, in the washing of relatively coarse, raw crushed coal in the range of $\frac{3}{4}\times 0$ to $\frac{1}{2}\times 0$ and the like, it has been observed that only about 12% to about 20% of this size crushed coal has a particle size less than 32 mesh to be properly qualified as fines. If the coal is difficult to fracture, it has more fines, e.g., closer to 20%.

These fines build up during recirculation of "water only", which is the water medium, and change the recovery settings as shown in FIG. 12. Note clean coal recirculation at the top corners of FIG. 14. This represents a shift in scale to predict cyclone top percent recovery from the vortex finder sleeve diameter.

TABLE A

BEST MODE AND RANGE OF SELECTED CYCLONE DIMENSIONS SIZE EXPRESSED IN TERMS OF BOWL DIAMETER AND INCHES (ID) OF 18" BOWL SHOWN BY REFERENCE NUMERAL 28 IN FIGS. 1, 2, 3, 5, AND 6

Dimensions of Larger & Smaller Cyclone Parts are Proportional for Each Part to "B" Product Values in Column 6 Below

| FIG. Number | Reference Number | Part | Identifying Letter | Preferred Size in Inches | Preferred Size Expressed in Terms of B | Range in Terms of B | Range in Inches |
|---|---|---|---|---|---|---|---|
| 5,6,7,8 | 28 | Bowl Diameter | B | 18.0 | 1.00 | | |
| 1,2,3,5 6,7,8 | 22 | Inlet Tube | A | 6.0 | .33 | .25-.35 | 4.5-6.4 |
| 3,6 | 60&48 60a&48 | Vortex Finder Depth Between | C | 4.3 | .23 | .00-.26 | 0.0-4.8 |
| 3,4,6 7,8 | 48,46, 148,248 | Vortex Finder Sleeve I.D. | D | 6.5 | .36 | .30-.50 | 5.5-9.0 |
| 3,6,9, 10,11 | 26,75, 95 | Orifice Small I.D. | E | 3.6 | .21 | .16-.25 | 3.0-4.5 |
| 3,5,6 | 44&28 | Bowl Width Between | F | 4.2 | .23 | .20-.31 | 3.6-5.6 |
| 3,6,9 | | $\theta_4$ Included Angle Depth | G | 2.0 | .11 | .00-.24 | 0.0-4.4 |
| 3,6,9 10,11 | 60,60a, 70,80 90 | Dish-Orifice Unit Height | H | 12.4 | .69 | .56-1.0 | 10.0-18.0 |
| 3,6,9 10,11 | | Dish Height, Between Dish Top & Plate 32 | $H_1$ | 5.4 | .30 | .19-.67 | 3.4-12.1 |
| 3,6,9 10,11 | | Height of Orifice, Between Plate 32 Top & Orifice Bottom | J | 7.0 | .39 | .15-.67 | 2.7-12.1 |
| 2,3,6 | 29&32 | Bowl Height Be- | K | 22.0 | 1.22 | 1.12-1.32 | 20.1-23.8 |

TABLE A-continued

BEST MODE AND RANGE OF SELECTED CYCLONE DIMENSIONS SIZE EXPRESSED IN TERMS OF BOWL DIAMETER AND INCHES (ID) OF 18" BOWL SHOWN BY REFERENCE NUMERAL 28 IN FIGS. 1, 2, 3, 5, AND 6

| | | | Dimensions of Larger & Smaller Cyclone Parts are Proportional for Each Part to "B" Product Values in Column 6 Below | | | | |
|---|---|---|---|---|---|---|---|
| FIG. Number | Reference Number | Part | Identifying Letter | Preferred Size in Inches | Preferred Size Expressed in Terms of B | Range in Terms of B | Range in Inches |
| | | tween | | | | | |
| 3,6 | 30&60 30&60a | Dish Depth Between | L | 16.7 | .93 | .82–1.0 | 14.7–18.0 |
| 3,6,9 10,11 | | Dia. at Throat Entrance to Radius N | M | 7.1 | .39 | .28–.51 | 5.0–9.2 |
| 3,6,9 10,11 | 12 | Radius Connecting $\theta_4$–$\theta_9$ | N | 3.5 | .20 | .18–.21 | 3.2–3.8 |
| 3,6,9 | 11 | Radius Connecting $\theta_4$–$\theta_5$ | P | 4.5 | .25 | .19–.28 | 3.4–5.1 |
| 3,6,9 10,11 | | $\Delta\theta$ Depth or Height of Radius 12 | Q | 2.5 | .14 | .06–.28 | 1.0–5.1 |
| 3,6,9 10,11 | 26,75 95 | Orifice Small I.D. Height | S | 1.0 | .06 | .00–.22 | 0.0–4.0 |
| 3,6,9 10,11 | | Throat Height Between M & Top of S | T | 6.9 | .38 | .11–.67 | 1.9–12.1 |
| 3,6,9 10,11 | 64,64a 74,84 94 | Orifice Bottom Outside Dia. | W | 5.0 | .28 | .19–.56 | 3.4–10.1 |
| 3,6,9 | | $\theta_5$ Depth Between G & M | Y | 2.4 | .13 | .00–.33 | 0.0–6.0 |
| 3,6 | | Depth from Inlet 22 to Dish Top 62, etc. | Z | 9.7 | .54 | .22–1.0 | 3.9–18.0 |
| 3,6,9 | $\theta_4$ | Dish Top Included Angle | $\theta_4$ | 85° | | ±15° | |
| 3,6,9 | $\theta_5$ | Dish Bottom Included Angle | $\theta_5$ | 110° | | ±15° | |
| 10,11 | $\theta_6$ | Dish Single Included Angle | $\theta_6$ | 100° | | ±15° | |
| 9,10,11 | $\theta_9$ | Orifice Included Angle Between Radius 12 & E | $\theta_9$ | 12° | | +7° −3° | |

CENTRIFUGAL SEPARATION (a) Basic Apparatus Postulates for Theory of Operation of the Present Invention The following are the requirements for the apparatus of the present invention:

1. Crushed coal water is quick draining, noncompressible, nongelatinous, and does not plug draining media.
2. The ash and sulfur impurity has a different specific gravity than the main product and quantity of total ash or sulfur impurity is less than 50% with mineral ash less than 40%, this representing what is defined as a producible coal.

I have discovered that the critical geometry, Table A, of a gravity separating shallow cyclone 20 having a conical bottom with bottom apex angles $\theta_4$ and $\theta_5$ of about 85° and 110°, preferably 100°±5° for an equivalent combined angle, is an essential factor which consistently and reproducibly predicts differences of separation, FIG. 12 of impurity from the desired product and further predicts the recovery or desired product and further predicts the recovery or capacity of the cyclone 20 to predetermined the precise adjustments of the critical variables of the cyclone 20, which are shown in Table A. The above combined angle $\theta_4$ and $\theta_5$ of 100°±5° is $\theta_6$ in Table A.

(b) Function of Cyclone 20 Parts

1. The inlet (22) pipe deflector 23 means creating laminar or streamline flow directs the slurry along the bowl wall 28 of the cyclone 20 in a downwardly tangential helix with all particles layered by gravity from the inside wall 28 outwardly;
2. The vortex finder 44 sleeve 46, 146, 246 area based on the inner diameter D of the cylindrical structure 48, FIG. 4, which functions to withdraw lights above the shallow bottom 60, 60A, 70, 80 and 90;
3. The outlet orifice 64, 64A, 74, 84 and 94 diameter E which functions as a partial baffle or restrictor in its critical relation to the vortex finder 44 sleeve 46, 146, 246 area sizing to expand or to compress the number of helical turns, see FIG. 6, 170, in the tangentially streamline laminar flow and to further effect a smooth streamlined layered outflow of layered product through the vortex finder outlet pipe 44 above the vortex finder sleeve 46, 146, 246 from the bottom separation zone within the dish-orifice 60, 60A, 70, 80 and 90;
4. The spacing C of the vortex finder 44 sleeve 46, 146, 246 permitting the smooth withdrawal of upward flow so that through the vortex finder 44 from the super gravity zone in the bottom cone 60, 60A, 70, 80 and 90, must be no more than 90% of the straight side wall height L of the cyclone 20 measured from the top edge of the cone 60, 60A, 70, 80 and 90 to the top 30 along inner wall 28 of the cyclone 20;
5. Pressure differential of at least 0.9 up to 1.8 preferably 1.5±0.2 atmospheres between the inlet tube 22 and the outlet pipe or vortex finder 44, the latter both being at atmospheric pressure thereby fixing the initial super gravity forces which maintain the essential separation between the vertical layers 1, 2, 3, 4 and 5 in FIGS. 3 and 5 in the straight side wall 28 section of the cyclone 20 and which maintain the high velocity momentum of the heavy particles in the conical bottom 60, 60A, 70, 80 and 90 departing from the restricted bottom orifice 64, 64A, 74, 84 and 94 to prevent undesired contamination of the light particles removed through the vortex finder 44. The high velocity momentum based on gravity, and the centrifugal velocity in the cyclone 20 and the abrupt change in direction at the bottom cone in 60, 60A, 70, 80 and 90 is sufficient under a $\Delta p$ of 1.5 atmospheres to completely overcome a tendency to wander from the outer conical wall in 60, 60A, 70, 80 and 90 zone towards the vacuuming zone within the vortex finder 44. See FIG. 3 for estimating short critical lateral cross-over distances.

(c) Preserving Streamline Flow

For sharp separation of different specific gravity materials in cyclone 20 apparatus a smooth streamline flow must be created at the entrance 22 when the material first enters the cyclone bowl 28; in order that smooth layers 1, 2, 3, 4 and 5 of different specific gravity particles will be created and aligned. The different specific gravity materials must be allowed to seek their respective layers 1, 2, 3, 4, and 5.

It is very critical that these layers 1, 2, 3, 4 and 5 are not destroyed until each one has departed from the cyclone bowl 28 and bottom unit 60, 60A, 70, 80 and 90. Prior art focused on separation within the bowl without considering the development of the reverse flow path and the effect this development had on each of the different specific gravity layers 1, 2, 3, 4 and 5 and the circular helical fluid velocity of 15 to 28 feet per second in the separating zone in 60, 60A, 70, 80 and 90 at the bottom conical portion of the cyclone bowl 28.

The laminar streamline flow develops two desirable situations.

The first creation of different specific gravity solid material layers 1, 2, 3, 4 and 5 lines up the materials swirling around the upper portion of the cyclone bowl 28 with the heaviest materials against the bowl wall 28 and the corresponding layers in the bowl width F between the vortex finder 44 and the cyclone bowl wall 28 FIGS. 3 and 6 containing lighter materials as you travel away from the bowl wall 28 towards the vortex finder 44 wall. This alignment of materials sets the stage for the vacuuming operation. It is very critical that the solid particle helical 170 circular velocities be maintained while the particles are in the cyclone bowl 28 thus the reason for the squat cyclone to permit about 2 to 3 turns before entering the dish 62, 62A, 72, 82 and 92 zone. Once the light particles enter the vortex finder 44 sleeve 46, 146, 246 inner diameter D or the heavy particles enter the bottom orifice 64, 64A, 74, 84 and 94 inner diameter E, the helical 170 circular fluid velocities are no longer critical. Velocity may be radians per second (RadPS), rpm or Rps.

The quantity of material (pump slurry) being pumped for an 18" classifying cyclone 20 should be about 1500 GPM of 10 to 35% solid slurry. This flow quantity will yield the necessary entrance fluid velocity of from 15 to 28 feet per second for cyclones 20 equipped with the streamline flow deflector 23 to provide the centrifugal forces necessary in the dish 62, 62A, 72, 82 and 92 and orifice 64, 64A, 74, 84 and 94 separation zone within 60, 60A, 70, 80 and 90. See FIG. 3 for separation.

(d) Vacuuming Forces

The vacuuming forces are developed by the pressure differential between the inlet pipe 22 and the vortex finder 44 sleeve 46, 146, 246 inner diameter D outlet 24. The pressure differential must be in the order of 0.9 to 1.8 atmospheres to develop the vacuuming forces necessary to separate more efficiently the solid particle layers 1, 2, 3, 4 and 5 as they enter the separation zone within 60, 60A, 70, 80 and 90. The stage is now set for selective separation by particle specific gravity and not by particle size.

All particles must have enough helical circular 170 velocity momentum in order that the higher specific gravity particles will have enough centrifugal force at the correct RPM within 60, 60A, 70, 80 and 90 to overcome the vacuuming force in the separation zone within 60, 60A, 70, 80 and 90 maintain their position in the outer heaviest particle layers 4 and 5 and report to the bottom orifice 64, 64A, 74, 84 and 94 outlet 26 and out of the cyclone 20. If the solid particles had not been layered according to particle specific gravity, it is possible for some of the heavier specific gravity particles to be vacuumed away up through outlet 24 with a large amount of the light specific gravity particles thus misplacing material, which does occur after considerable use of the cyclone 20 due to flow disturbances created by wear.

The amount of vacuuming desired depends on the percentage of recoverable light specific gravity particles being processed and the RadP.S. desired in the vacuuming zone within 60, 60A, 70, 80 and 90 which determines the specific gravity separation setting. The larger the percentage of recoverable light specific gravity particles, the larger the vacuuming area necessary to recover the particles. Vice versa for the smaller the percentage of recoverable light specific gravity particles, the smaller the vacuuming area. The vacuuming area is controlled by the inner diameter D and the length of about 0.3B minimum of the vortex finder 44 sleeve 46, 146, 246.

(e) Pressure Differential For Vacuuming Forces

The test runs using both laminar streamline flow and nonlaminar flow at flow rates between 800 and 1500 GPM produced a large difference of 7 psi in pressure differentials between inlet 22 and outlet 24 and a large observable circular helical 170 swirling fluid velocity difference. The pressure differential of 0.9 to 1.8 atmospheres was produced only when laminar streamline flow was used. The maximum pressure differential obtained without laminar streamline flow was 8 to 13 psi gauge. Very poor separation of low and high specific gravity particles was observed.

The poor separation without streamline flow was blamed more on not forming the different smooth layers 1, 2, 3, 4 and 5 than on the lower pressure differential. But it is obvious that when the centrifugal force of the particles is increased by the high circular helical 170 fluid velocities (15 to 28 feet per second) that a greater pressure differential will be required to vacuum the low specific gravity particles off the high specific gravity particles.

As the particles under angular acceleration with increasing angular velocity enter the separation zone within 60, 60A, 70, 80 and 90, the different specific gravity materials will have a wider range of vacuum resistance forces thus making the light specific gravity particles easy to vacuum compared to the higher specific gravity particles which are very difficult to vacuum at these centrifugal forces created by helical 170 swirling linear fluid velocities between 15 and 28 feet per second at the separation RadPS required within 60, 60A, 70, 80 and 90. See FIG. 6 for angular acceleration in terms of Rad PS.

At low circular helical 170 fluid velocities in the separation zone at the bottom conical portion within 60, 60A, 70, 80 and 90 of the cyclone 20, the vacuuming resistance forces of the light and heavy specific gravity particles have a much closer value thus both types of particles being predominant. This causes misplaced material and a low quality clean coal product. Also, some of the larger light specific gravity particles report to the bottom orifice 64, 64A, 74, 84 and 94 outlet 26 proven by refuse washability tests.

(f) Effect of Compression Before and Loss of Compression After

The large observable circular helical 170 swirling fluid velocity difference was observed by the physical characteristics of the plant operating. With the nonlaminar flow a large amount of noise and plant vibrations were present. The cyclones themselves shook from flow resistance. When the flow was changed to laminar streamline flow, the speed of the material was such that the same bottom orifice used with the nonlaminar flow, producing 70% plant recovery for a two-stage circuit allowed about all of the raw coal to be discharged out through the bottom orifice. The bottom orifice was changed from a 0.236B" I.D. to a 0.208B" I.D. to yield the same 70% plant recovery. Obviously, the velocity through the cyclone was increased very significantly when using laminar streamline flow to empty the cyclone bowl 28 so fast when using the exact same bottom orifice. All noise and vibrations stopped when laminar streamline flow was used. The surprising discovery was that clean coal ash dropped from 18%-20% in turbulent flow down to 8-11% in streamline flow.

(g) Basic Theory Differences Between Centrifugal Separation and Jigging Separation

| Jiggling Cyclone | Centrifugal Separation Cyclone 20 |
|---|---|
| (a) Low Velocity | (a) High Velocity |
| (b) High Kinetic Energy Due to Turbulence. | (b) Substantially Zero Kinetic Energy Due to No Turbulence |
| (c) Low Potential Energy Due to Low Velocity and Low Pressure Differential as Indicated by Inlet Pipe Gauge 66 and Outlet Pipe Gauge 68 | (c) High Potential Energy Due to Pressure Differential Between Inlet 22 Pipe Gauge 66 and Light Fraction Outlet 24 Pipe Gauge 68 Which is .9 to 1.8 Atmospheres |
| (d) Very Low Super Gravity (.5 to 0.8 atmospheres) | (d) High Super Gravity Forces (.9 to 1.8 atmospheres) |

Quick Change Vortex Finder Sleeve Kit For Maximum Quality and Recovery of Clean Coal (A) Introduction Each of FIGS. 3, 4, 6, 7, and 8 show different diameter settings of the vortex finder sleeve; the change in diameter D is facilitated by the quick change plate 32 and pivotable fixture bolt 38' which drops the dish. Different dish-orifices 60, 60*a*, 70, 80 or 90 can each be quickly checked after being dropped and pivoted for wear and then exchanged if need be at the same time when changing the vortex finder sleeves 46, 146, or 246 to the desired setting. In the assembly 39 shown in FIGS. 4 and 6, a flange 52 is provided on collar 50 which is welded to sleeve unit 48 at 49. A bayonet joint (slot 56, pin 54) releasably secures the sleeve assembly onto the vortex finder 44. In the assemblies 139 and 239, FIGS. 7 and 8, the collar 150, 250, is welded to the sleeve units 148, 248 and vortex finder 144, 244, by welds 149, 249, 152 and 252. Welds 152 and 252 are tack and/or stitch welds which are spaced at intervals about the periphery of the vortex finder. Only 3 tack and/or stitch welds approximately ¼" to ⅜" long are required.

Streamline non-turbulent flow must be maintained (see Case I) in order for high production and efficiency to be achieved in a single, a two stage, or a multi-stage operation beyond two stages. To ensure efficient operation the vortex finder 44 settings, and selection of the dish-orifice 60, 60*a*, 70, 80 or 90 materials are adjusted to the wear conditions encountered and these must all be handled quickly by means of the quick change plate 32, the fixture bolt 38' and the fasteners 38.

In the fine and coarse coal separation of U.S. Pat. No. 4,217,207, the most serious problems which were encountered were the quick change steps to maintain high production and efficiency. These changes were specifically:

1. Quick change of diameter settings of vortex finder 44
2. Replacement of different size or worn dishes An additional problem encountered during the test runs was the optimum vortex finder depth setting. Different raw coals vary in grindability or fracturability as illustrated in Table D, section 6. The crushed particles of dirt and clean coal from easily fracturing coal display large differences between coal and refuse in specific gravities of the order of 0.9 sp. gr. and larger. The more difficult fracturing raw coals produce particles of dirt, low grade middling coals, and clean coals. The middling coals which contain inorganic sulfurs, shales, clays, and other impurities have specific gravities in the range of 1.4 to 1.7. These narrow differences in sp. gr. of about 0.3 units are accounted for by the clinging concentration of impurities which do not separate from the clean coal in the coal particle.

The middling coals create the need for a very selective separation process. By very laborius and time consuming testing the importance of the heavy particle spin out was discovered and controlled by the depth of the vortex finder sleeve 36, 146 and 246 bottom edge with respect to the top edge of the dish 60, 62*a*, 70, 80 or 90.

(B) Criticality of Vortex Finder Height

My first tests in attempting to fix the vortex finder height indicated that the inner swirling upwardly moving clean coal slurry picks up some heavy specific gravity particles which then spin back out of the upwardly moving spiral (the inner spiral) and into the downwardly moving spiral (the outward spiral) surrounding the inner swirling upwardly moving spiral path which contains the clean coal. The vortex finder height was changed from a negative value (indicating protrusion into the dish) in a series of trial and error steps to a value that no longer yielded a better quality clean coal. At the value of 0.24 B above the dish edge the maximum improvement in coal quality was discovered. Adjusting the height dimension to a greater value than 0.25 B increased the path of travel of the clean coal particles thus requiring more energy to maintain the vacuuming area and the centrifugal forces necessary to produce efficient separation.

Adjusting the height dimension to a smaller value that 0.22B cut short the heavy specific gravity particle spin out path before the particle had spun to the downwardly moving outer swirling flow thus misplacing the heavy specific gravity particle with the clean coal, thus producing lower quality clean coal. Thus, the height range is 0.22B to 0.25B, preferably 0.23B for optimum performance.

(C) Vortex Finder Sleeve Kit

The vortex finder sleeve kit shown in FIGS. 2, 3, 4, 7 and 8 is used to control recovery and improve quality. The height of the vortex finder in relation to the top edge of the dish is set at about 0.23B as pointed out above. The diameter of the vortex finder sleeve is set at about 0.3B to 0.5B depending on quality and quantity of clean coal desired. The length of the sleeve 46, 146, 246 in FIGS. 2, 3, 4, 5, 7, and 8 is at least about 0.33B and is fixed for all sizes because the length serves to stabilize the edges in the vacuum zone.

(D) Vacuuming Diameter and Column

The length of the vortex finder sleeve fixed at 0.33 and height setting of the vortex finder sleeve fixed at 0.23B determine the reverse flow path and the distance that the light sp. gr. particles must travel before exiting out through the sleeve. A length of vortex finder sleeve greater than 0.5B in cumbersome to handle and weld and wasteful of material. The length of the vortex finder sleeve stabilizes the vertical whirling ascending spiral in a fashion to shape it in a constant three dimensional form which is similar to a bell in shape. The diameter of the vortex finder sleeve determines the bottom vacuuming diameter and column of the bell shaped vortical form.

The larger the bottom vacuuming diameter of the bell shaped spiral then the lower the centrifugal force of each particle entering that larger diameter of the bell shaped form. The smaller the bottom vacuuming diameter of the bell shaped vortical the higher the centrifugal force of each particle entering that diameter.

In the dish zone the particles swirling down through the cyclone dish and bottom orifice experience about a three-fold increase in Rad PS between the dish top edge and the throat top M of the dish 62, 62*a*, 72, 82 or 92 in FIGS. 3, 6 and 9-11. This angular acceleration increases the centrifugal force on the particles as they travel along the inner surface of the dish and orifice.

(E) Optimum Centrifugal Force

By empirical testing the optimum centrifugal force for separating light sp. gr. particles from heavy sp. gr. particles for different run of the mine raw coals and gob piles have been determined indirectly through the sizing of the vortex finder sleeve diameter with respect to the percent recovery, raw coal ash content, clean coal ash content and the size of the bottom orifice diameter which expands or contracts "the lead of the screw," e.g., the swirling flow which presents a screw flight pathway within the dish and orifice unit.

The larger the vortex finder sleeve diameter, the lower the centrifugal force displayed by each particle as it enters the larger vacuuming area created by the vortex finder sleeve diameter D. This yields high recoveries with lower quality clean coal.

(F) Method Of Changing Vortex Finder From One Diameter To Another

Two types of sleeves can be produced and installed in the vortex finder to change the diameter. One, shown in FIG. 4, is a quick-change sleeve 46 with bayonet attachment of the type shown in U.S. Pat. Nos. 795,338 and 1,329,141. The second is the tack and stitch weld attachment sleeve 146 and 246 shown in FIGS. 7 and 8.

Figure 8:
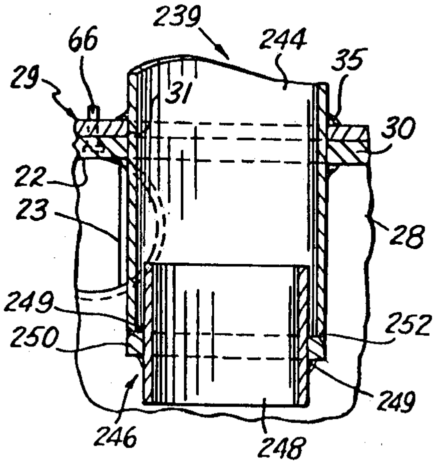

The quick-change sleeve assembly 46 of selected size is installed by cutting bayonet slots 56 in the bottom of vortex finder 44, welding lugs 54 to flange 52 of a selected size sleeve assembly and obviously joining lugs 54 to a selected size sleeve having an outer diameter of approximately the same size as the vortex finder's inner diameter, reference is made to FIG. 8 illustrating the lack of sufficient space to accommodate flange 52 between sleeve 246 and the vortex finder 244, after which the sleeve assembly is installed from the bottom opening of the cyclone with plate 32 and orifice dish 62 displaced on pivot bolt 38'. Alternatively, a collar 150 or 250 can be welded to the vortex finder 144 or 244 by a welder using mirrors to observe the operation as discussed herewith.

In a small cyclone, the tack and stitch weld 152 or 252 can be made through the bottom of the cyclone despite access difficulty by the mirror weld method. This tack and stitch method requires attaching vortex finder sleeves 146 or 246 from the bottom by means of a mirror to aid the welder visually as he tack welds the sleeve in place. This prevents the welder from exposing his body to the hot slag and sparks falling from the welding. Only three stitches or tacks 152 or 252, approximately ½" to ¾" long and equally spaced around the periphery of the vortex finder 144 or 244 and ring 150 or 250, as shown in FIGS. 7 and 8, are required.

Due to the longer change time required for the tack and stitch welding method, bayonet quick-change sleeve 46 is the preferred kit. Selected size sleeves are manufactured by providing metal holder 50 FIGS. 2, 3, 4 and 6 in the form of a collar with an inner opening to receive a selected size sleeve 48 having a length of at least 0.3B with an annular flange of a constant diameter corresponding to the diameter of the vortex finder 44 FIGS. 2, 3, 4 and 6 to match a sleeve kit containing a plurality of sleeves 48 each one having a different graduated diameter, the inner diameter of the sleeves ranging from 0.3B to 0.5B where B is the inner diameter of the cyclone bowl.

The collar 50 is welded around the periphery of a selected size sleeve 48 to a bayonet pin seat 52 in the form of a ring around the sleeve 48 to align the central vertical axis of cyclone 20 with the center axis of the selected sleeve 48 as shown in FIG. 1. Bayonet pins 54 are joined to alignment flange 52. The plant is able to continue operation with the bayonet modification under any emergency. However, the change sleeves in FIGS. 7 and 8 can be made up in advance, are lower in cost, and can be used when large tonnage of a straight run of mine coal is to be washed. The steel sleeves last for at least 30,000 tons and change is a minor operation during routine maintenance.

V.

Critical Geometry of One Piece Shallow Bottom Dish-Orifice Unit (a) Relation of Dish-Orifice Unit Depth L To Bowl Diameter B and to Total Bowl Height K As shown in Table A Section II, the optimum value dish orifice unit depth L expressed in terms is about 0.93B, about 17/18 of the bowl diameter. If the depth L is less than about 14/18, e.g. about 0.078B, then the dish is so shallow as to cut the number of helical terms 170 by about 40% which results in a totally insufficient separation because of a prohibitive reduction of residence time. Further, the upward adjustment of the vortex finder sleeve which is needed to maintain vacuuming dynamics comes dangerously close to the inlet tube level thereby creating the condition which Fitch Jr., et al. claims in U.S. Pat. No. 3,501,014 at Col. 6, lines 59-60 the "short circuit effect" by "contaminants from the inlet to the vortex finder" At L values higher than B, the path 170 in FIG. 6 becomes too long losing energy and separation efficiency. Accordingly, the range of L is 0.82 to B with optimum at 0.93B.

In terms of K, the value of L can best be explained in terms of the effect observed with the path 170 in FIG. 6. Obviously, the deflector created streamline flow providing the three turns of the helical path is clearly dependent upon the total height - e.g. K. By lengthening K to add two or three turns in the upper bowl section above the dish we obviously lose energy. After thousands of observations it was established that two turns are insufficient for separation and more than four turns are wasteful of centrifugal energy which is the sole force used in separation. This results in a K value between 1.12B to 1.32B, preferably 1.22B. Obviously this describes a squat cyclone.

(b) Dish and Orifice Geometry, Vortex Finder Sleeve Area and Orifice Outlet Area For high speed laminar flow squat cyclones no tight or fast turns in flow direction can be applied to the slurry path yet the path of travel must be a minimum, See FIG. 6. The circular diameter of the swirling flow must be decreased as rapidly as possible without loss of energy, or without turbulance being introduced. Smooth transition curves must be used between included angle changes in geometry, See Table A. Tests to date, indicate that a maximum included angle of 110° is the largest useable dish angle for best separation efficiency. The long cone cyclones experience too great a loss in rotational energy to yield the energy necessary in the separation zone and in the inner upwardly traveling vortical swirl for maximum efficiency. The path distance for particles in a long cone cyclone is at least 0 to 1 compared to the path distance in the cyclone of the invention which indicates a need for three times the energy requirement or only $\frac{1}{3}$ the energy is available for the separation process.

(c) Identification of Dish Top Angles In Dish Types

Figure 9:
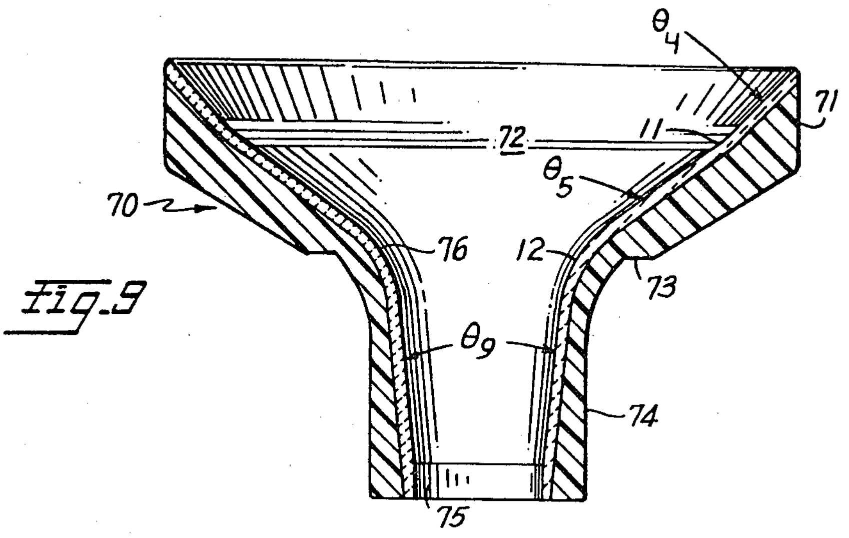
FIGS. 9, 10 and 11 are enlarged vertical, sectional views showing modifications of the cyclone dish and refuse outlet orifice member.
Figure 10:
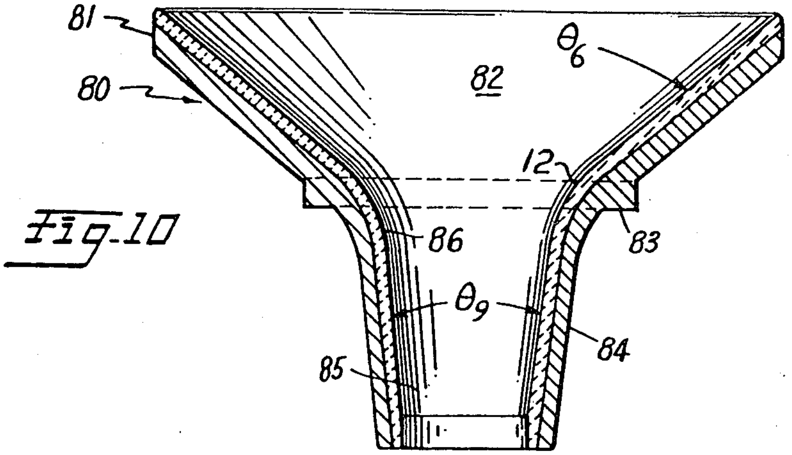
Figure 11:
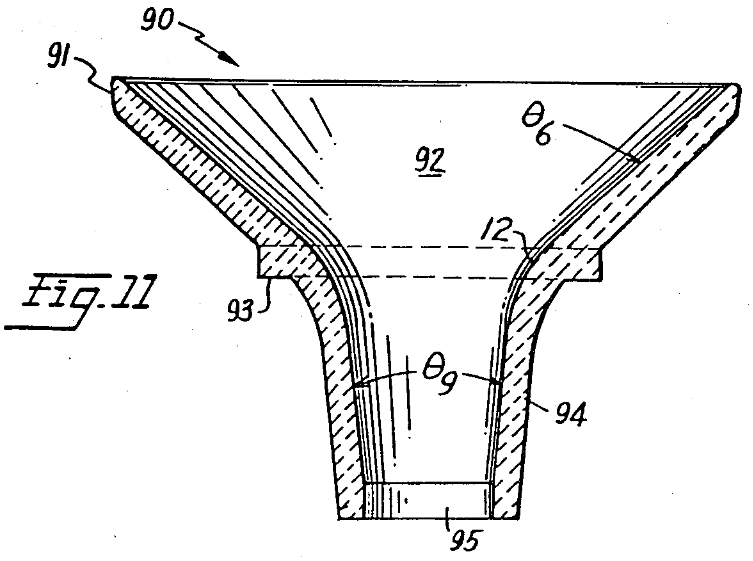

The double or single top angles of the dish, indicated by $\theta_4$ and $\theta_5$ (for the double angle), or by $\theta_6$ (only in the single angle) See FIGS. 9, 10 and 11 provides the first compression rotational acceleration increasing the centrifugal force on each particle.

The spiral path through angle $\theta_5$ continues the speed up process to increase angular velocity accelerating the rotation expressed in RadP.S. two to three fold. Acceleration of the vertical downward velocity without substantially lessening the kinetic energy and horizontal velocity component results in an increase of the exiting velocity of the refuse from the dish out of the orifice 64*a* in FIG. 6, where it enters into the top part of the orifice. The separation zone is at the throat of 64 where the height of radius 12 in FIG. 6 is less than one complete spiral height. This fixes separation at the position of the accelerated spiral 170, FIG. 6 at the smallest diameter of the cyclone radius 12 connecting the dish to the orifice.

As shown in FIG. 6, the helix 170 expands at its bottom to increase in height so that in the orifice the helix 170 stretches to occupy the entire throat height T (See Table A) during one revolution. This finish point of this one turn brings refuse to a position at the back of the orifice throat.

The smaller the vortex finder sleeve diameter, the higher the centrifugal force as the particle enters the smaller vacuuming area and lower recoveries with better quality clean coal results.

It is totally unexpected that a shallow dish whose accelerating effect on the downward velocity component exhibits a stabilizing effect on the upward reverse vortical flow of the light particles under vacuuming forces. Stabilization by means of the vortex finder sleeve height 0.33B axially aligns the ascending vortical whirling helix transport light particles along the central axis of the cyclone, and out of the clean coal outlet.

After testing every possible position of the vortex finder in and out of the dish and at the extreme top position in scores of plant runs and in combination with every variation of vortex finder diameter D and orifice diameter E and dish exit diameter M it was discovered that only the critical shallow dimensions in Table A coupled with the vortex finder D dimension constitute the required adjustments for sulphur and ash removla of raw crushed coal. Equally surprising is the discovery that the practical washing of coal having 45 to 50% of ash in a size as large as $\frac{3}{4}\times 0$ can be carried out successfully based upon this adjustment. Although it is preferable to use smaller crushed sizes e.g. $\frac{5}{8}\times 0$ or $\frac{3}{4}\times 0$, the adaptability of the invention extends to larger sizes for which there is a greater demand for fluidized bed in gas conversion processes.

Having thus disclosed the invention, I now claim:

1. A method of installing a quick-change sleeve in a vortex finder of a cyclone having a bottom dish and orifice in order to change the diameter of the vortex finder, which vortex finder constitutes the sole outflow for the light fractions separated in a centrifugal cyclone, a jigging cyclone or a clarifying cyclone, said method comprising the steps of:

(a) providing a plurality of doughnut shaped metal holders having a flange thereon which abuts against the lower edge of said vortex finder, (b) providing a sleeve kit containing a plurality of sleeves, each one thereof having a length of at least 0.3B, where B is the inner diameter of the cyclone bowl, and a different graduated diameter from any other sleeve in said kit, to adjust the outflow of light fractions, (c) welding a sleeve of said sleeve kit inside of a corresponding said doughnut shaped holder, (d) cutting a bayonet slot at the lower edge of said vortex finder sleeve, (e) welding a bayonet pin to the flange above said doughnut shaped holder to fit into said bayonet slot, and (f) selectively limiting the diameter of said sleeve in said kit from 0.3B to 0.5B where B is the inner diameter of the bowl of said cyclone.

* * * * *